United States Patent
Shimonishi (10) Patent No.: US 8,004,989 B2
(45) Date of Patent: Aug. 23, 2011

(54) CONTROLLING A WINDOW FOR CONGESTION CONTROL IN A NETWORK

(75) Inventor: Hideyuki Shimonishi, Tokyo (JP)

(73) Assignee: NEC Corporation, Tokyo (JP)

( * ) Notice: Subject to any disclaimer, the term of this patent is extended or adjusted under 35 U.S.C. 154(b) by 44 days.

(21) Appl. No.: 12/208,053

(22) Filed: Sep. 10, 2008

(65) Prior Publication Data

US 2009/0073975 A1    Mar. 19, 2009

(30) Foreign Application Priority Data

Sep. 19, 2007 (JP) ................. 2007-242420

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........ 370/235; 370/229; 370/236; 370/254; 709/234

(58) Field of Classification Search .............. None
See application file for complete search history.

(56) References Cited

U.S. PATENT DOCUMENTS

| | | | | |
|---|---|---|---|---|
| 6,757,255 | B1 * | 6/2004 | Aoki et al. ............... | 370/252 |
| 7,035,214 | B1 * | 4/2006 | Seddigh et al. ............ | 370/231 |
| 7,333,431 | B2 * | 2/2008 | Wen et al. ................. | 370/230.1 |
| 7,385,923 | B2 * | 6/2008 | Baratakke et al. ........... | 370/235 |
| 7,394,762 | B2 * | 7/2008 | Leith et al. ................ | 370/229 |
| 2005/0068911 | A1 * | 3/2005 | Miyake et al. .............. | 370/299 |
| 2006/0023710 | A1 * | 2/2006 | Read ....................... | 370/389 |
| 2006/0227708 | A1 | 10/2006 | Tan et al. | |
| 2007/0076621 | A1 * | 4/2007 | Malhotra et al. ............ | 370/252 |
| 2007/0165531 | A1 * | 7/2007 | Labrador et al. ............ | 370/235 |

FOREIGN PATENT DOCUMENTS

| | | |
|---|---|---|
| JP | 07-170269 | 7/1995 |
| JP | 2005-110038 | 4/2005 |
| JP | 2006-217234 | 8/2006 |
| JP | 2007-097144 | 4/2007 |

OTHER PUBLICATIONS

Lawrence S. Brakmo, et al., "TCP Vegas: End to End Congestion Avoidance on a Global Internet," IEEE Journal on Selected Areas in Communication, vol. 12, No. 8, Oct. 1995, pp. 1465-1480.

Cheng Jin, et al., "Fast TCP: From Theory to Experiments," IEEE Network, 19(1):4-11, Jan./Feb. 2005.

(Continued)

*Primary Examiner* — Ayaz R Sheikh
*Assistant Examiner* — Peter Chau
(74) *Attorney, Agent, or Firm* — Dickstein Shapiro LLP (57) ABSTRACT

A communication method includes steps of: transmitting a plurality of packets to a network according to a window specifying a data amount of the packets to be transmitted to the network; receiving ACK related to the packets transmitted to the network, and detecting whether or not packet discard occurs; measuring a RTT by using the received ACK; calculating a discarding interval indicating a time interval of the packet discard; calculating an increase amount for a current window by using the calculated discarding interval; and updating the current window by using the calculated increase amount if the packet discard is not detected.

18 Claims, 8 Drawing Sheets

OTHER PUBLICATIONS

W. Stevens, "TCP Slow Start, Congestion Avoidance, Fast Retransmit, and Fast Recovery Algorithms," RFC 2001 Network Working Group Request for Comments: 2001, Jan. 1997.

Shao Liu, et al., "TCP-Illinois: A Loss and Delay-Based Congestion Control Algorithm for High-Speed Networks," Proc. First International Conference on Performance Evaluation Methodologies and Tools (Valuetools), Pisa, Italy, Oct. 11-13, 2006, pp. 1-13.

* cited by examiner

CONTROLLING A WINDOW FOR CONGESTION CONTROL IN A NETWORK

This application is based upon and claims the benefit of priority from Japanese patent application No. 2007-242420, filed on Sep. 19, 2007, the disclosure of which is incorporated herein in its entirety by reference.

BACKGROUND OF THE INVENTION

1. Field of the Invention

The present invention relates to a technique for controlling a window used for congestion control over a network to which TCP (Transmission Control Protocol) is applied.

2. Description of the Related Art

TCP is the most frequently protocol as the fourth layer protocol for data communication on the Internet. By using the TCP, highly reliable communication between communication devices, that is, communication ensuring that data loss hardly occurs during communication can be realized.

The TCP provides a congestion control function. Under the congestion control, a sender device adjusts a window of the device according to a congestion situation of a network. If no congestion occurs on the network, a transmission band is widened by setting the window large. If congestion occurs on the network, the transmission band is narrowed by setting the window small.

As a congestion window control method, an AIMD (Additive Increase Multiple Decrease) scheme based on packets is usually widely used. As the congestion control using this AIMD scheme, there is known "TCP-Reno" disclosed in W. Stevens, "TCP Slow Start, Congestion Avoidance, Fast Retransmit, and Fast Recovery Algorithms", RFC2001, January 1997. According to the AIMD scheme, a window size is increased linearly while no packet discard occurs. The window size is reduced by multiplying a value of a congestion window by a predetermined value equal to or greater than 1 when packet discard occurs.

However, the AIMD scheme has a problem that it is difficult to simultaneously realize both high speed and fairness of communication. In these circumstances, there is proposed a method of controlling the congestion window by using round trip time (hereinafter, "RTT") as an index of a detailed congestion degree of the network.

As the RTT-based congestion control method, there are known "TCP-Vegas" disclosed in L. Brakmo and L. Peterson, "TCP Vegas: End to End Congestion Avoidance on a Global Internet", IEEE Journal on Selected Areas in Communication, Vol. 13, No. 8, October 1995, pages 1465-1480 and "FAST" disclosed in Cheng Jin, David X. Wei, Steven H. Low, G. Buhrmaster, J. Bunn, D. H. Choe, R. L. A. Cottrell, J. C. Doyle, W. Feng, O. Martin, H. Newman, F. Paganini, S. Ravot, S. Singh, "IEEE Network", 19(1):4-11, January/February 2005. These methods are intended to estimate package amounts of a flow residing at nodes on the network and to control a congestion window size so as to keep the amounts of the residing packets constant.

There is also proposed "Compound-TCP" that is an enhanced type of the "TCP-Vegas" and "FAST" as disclosed in US Patent Application No. 2006/0227708. This method is intended to apply the sum of a congestion window size calculated based on RTT and a congestion window size calculated under AIMD control to a window size of a communication.

As methods of combination of the RTT and the AIMD control, there are proposed a method disclosed in Japanese Patent Application Laid-Open No. 2006-217234 and "TCP-Illinois" disclosed in S. Liu, T. Basar and R. Srikant, "TCP-Illinois: A Loss and Delay-Based Congestion Control Algorithm for High-Speed Networks", Proc. First International Conference on Performance Evaluation Methodologies and Tools (VALUETOOLS), Pisa, Italy, Oct. 11-13, 2006. With these methods, a value of the RTT measured just before the packet discard is compared with a minimum value of the RTT out of values of the RTT measured up to this time, and an increase amount for the congestion window is set large if the measured value of the RTT is close to the minimum value. If the measured value is not close to the minimum value, the increase amount for the congestion window is set small or set to a negative value. By doing so, if it is determined that the RTT is short, that is, the network is not congested, the AIMD control to increase the congestion window at higher speed is applied. If it is determined that the RTT is long, that is, the network is congested, the AIMD control to increase the congestion window at lower speed similarly to the conventional AIMD control is applied. Therefore, these methods have high affinity to the conventional AIMD control method if coexisting with the conventional AIMD control method on the network.

However, the above-stated conventional congestion control methods have the following problems. If a line speed is very high while a buffer amount of data which a node is to transmit is small, it is difficult to detect an increase in the RTT. Specifically, if the buffer amount is 128 KB and the line speed is 10 Gbps, for example, the measured value of the RTT has an error in the order of several microseconds (msec) with respect to theoretical RTT that is about 0.1 msec. In the circumstances in which such an error occurs, the increase in the RTT is difficult to detect.

If accurate RTT is not obtained by the above-stated congestion control methods, it is possibly erroneously determined that no congestion occurs although congestion actually occurs on the network. In this case, the window is positively increased during the congestion, resulting in further deterioration in the congestion.

SUMMARY OF THE INVENTION

It is an object of the present invention to provide a technique for appropriately increasing a TCP window even in a situation in which RTT is difficult to accurately measure.

According to one aspect of the present invention, a communication method comprising steps of: transmitting a plurality of packets to a network according to a window specifying a data amount of the packets to be transmitted to the network; receiving acknowledgement (ACK) related to the packets transmitted to the network, and detecting whether or not packet discard occurs; measuring a round trip time (RTT) by using the received ACK; calculating a discarding interval indicating a time interval of the packet discard; calculating an increase amount for a current window by using the calculated discarding interval; and updating the current window by using the calculated increase amount if the packet discard is not detected.

According to another aspect of the present invention, a communication device comprising: a transmission unit transmitting a plurality of packets to a network according to a window specifying a data amount of the packets to be transmitted to the network; a reception unit receiving acknowledgement (ACK) related to the packets transmitted to the network, and detecting whether or not packet discard occurs; a RTT measurement unit measuring a round trip time (RTT) by using the received ACK; a discard interval calculation unit calculating a discarding interval indicating a time interval of the packet discard; and a window setting unit calculating an increase amount for a current window by using the calculated discarding interval, and updating the current window by using the calculated increase amount if the reception unit does not detect the packet discard.

According to the present invention, even in a situation in which RTT on the network is difficult to accurately measure such as an instance in which a buffer amount of transmission data to a high speed line is quite small, the window can be appropriately increased.

DETAILED DESCRIPTION OF THE INVENTION

First Embodiment (Configuration)

Figure 1:
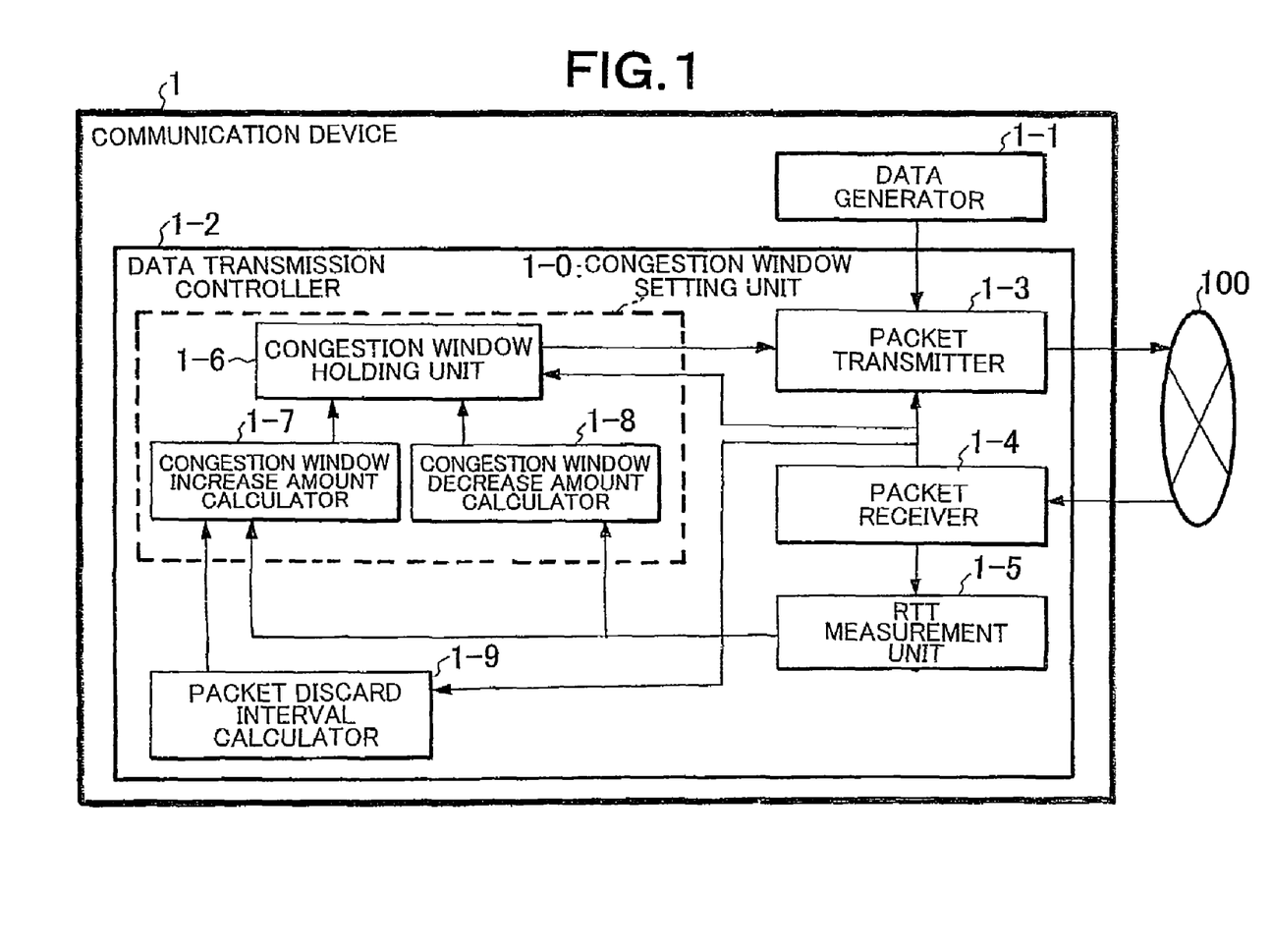
FIG. 1 is a block diagram showing a configuration of a communication device according to a first embodiment of the present invention.

FIG. 1 is a block diagram showing a configuration of a communication device 1 according to a first embodiment of the present invention. A data generator 1-1 generates data to be transmitted to a network 100. A data transmission controller 1-2 establishes a communication session between the communication device 1 and another communication device on the network 100 and transmits or receives packets to or from another communication device.

The data transmission controller 1-2 includes a packet transmitter 1-3, a packet receiver 1-4, an RTT measuring unit 1-5, a congestion window setting unit 1-0, and a packet discard interval calculator 1-9. The packet transmitter 1-3 packetizes transmission data from the data generator 1-1 and transmits packets to the network 100. The RTT measuring unit 1-5 calculates RTT using an acknowledgement (ACK) packet which the packet receiver 1-4 receives from the network 100. The congestion window setting unit 1-0 sets a congestion window compliant with the TCP to be applied to the packet transmitter 1-3. The packet discard interval calculator 1-9 calculates a time interval of packet discard.

A congestion window holding unit 1-6 of the congestion window setting unit 1-0 updates a value of the congestion window and holds the updated value of the congestion window. A congestion window increase amount calculator 1-7 of the congestion window setting unit 1-0 decides an increase amount for the congestion window for a situation in which the network is not congested. A congestion window decrease amount calculator 1-8 of the congestion window setting unit 1-0 decides a decrease amount for the congestion window for a situation in which the network is congested.

(Operation)

Figure 2:
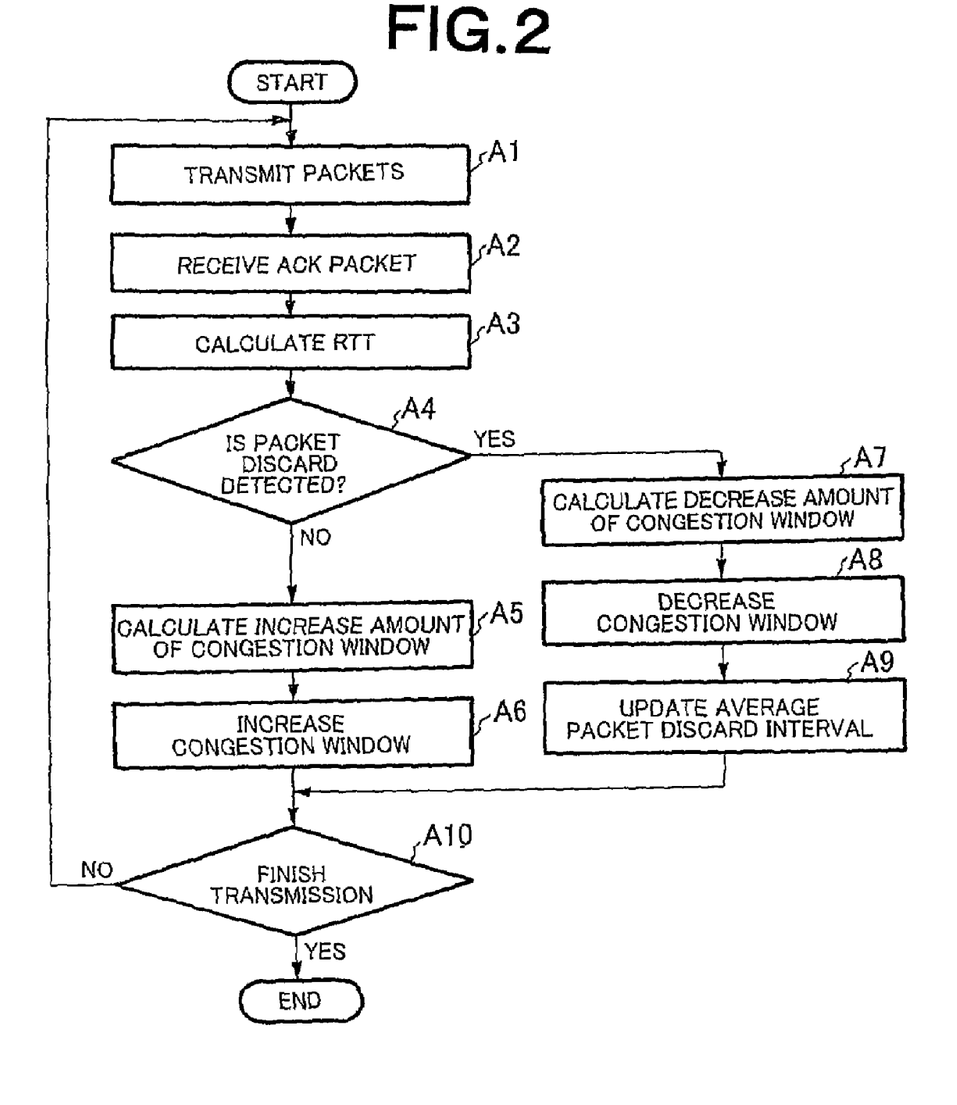
FIG. 2 is a flowchart showing operation according to the first embodiment of the present invention.

FIG. 2 is a flowchart describing operation performed by the communication device 1 according to the first embodiment. The operation performed by the communication device 1 according to the first embodiment will be described with reference to FIGS. 1 and 2.

When the data generator 1-1 generates transmission data, packet transmission starts (step A1). The packet transmitter 1-3 outputs packetized transmission data (packets) to the network 100 according to a current value of the congestion window stored in the congestion window holding unit 1-6. The packet transmitter 1-3 writes current time to a header of each of the packets to be transmitted as a timestamp.

If the value of the congestion window is large, many packets can be output to the network 100 at one time and high throughput is attained. Conversely, if the value of the congestion window is small, throughput is small.

If a destination communication device (not shown) receives the packets transmitted from the communication device 1, the destination communication device transmits an ACK packet to the communication device 1. The packet receiver 1-4 of the communication device 1 receives the ACK packet (step A2).

The packet receiver 1-4 determines whether each of the packets output from the packet transmitter 1-3 is not discarded on the network 100 using the ACK packet, calculates a data amount of data normally received by the destination communication device, and deletes the normally received data from the packet transmitter 1-3. The RTT measuring unit 1-5 calculates RTT based on a difference between current time and time stamp information supplied from the packet receiver 1-4 (step A3).

If the packet receiver 1-4 does not detect packet discard (step A4: No), the congestion window is increased because the network 100 is not congested. In this case, the congestion window increase amount calculator 1-7 calculates an increase amount for the congestion window as expressed by the later Equation (1) or (2) (step A5). The congestion window holding unit 1-6 updates the value of the congestion window by using the calculation result (step A6).

At the time of calculating the increase width (increase amount) of the congestion window, the congestion window increase amount calculator 1-7 decides an increase amount $\alpha$ for the congestion window as expressed by the following Equation (1) or (2). That is, the calculator 1-7 decides the increase amount $\alpha$ by using a larger value either a latest value of the discarding interval calculated by the calculator 1-9 or an average value Iavg of the discarding interval. As described later, the average value Iavg of the discarding interval is calculated by the packet discard interval calculator 1-9 when the packet receiver 1-4 detects the packet discard. The latest value of the discarding interval corresponds to a period between the current time and previous time of the packet discard ("previous packet discard time").

$$\alpha = b*\max(I\text{avg, current time} - \text{previous packet discard time}) \quad (1)$$

$$\alpha = b*f_1(\text{RTT} - \text{minimum RTT})*\max(I\text{avg, current time} - \text{previous packet discard time}) \quad (2).$$

In the Equations (1) and (2), "$f_1(x)$" denotes a decrease function of "x" and "b" denotes a parameter specifying a magnification of the increase amount $\alpha$. If "b" is larger, the increase amount for the congestion window becomes larger. In the Equation (2), a term corresponding to "b*

$e^{-f(RTT-RTTmin)}$" corresponds to that proposed in the Japanese Patent Application Laid-Open No. 2006-217234. An equation obtained by multiplying this term by a term of the discarding interval corresponds to the Equation (2).

The congestion window holding unit 1-6 increases the value of the congestion window as expressed by the following Equation (3) using the increase amount calculated as stated above. The Equation (3) signifies that the value of the congestion window is increased α times as fast as the "TCP-Reno" disclosed in W. Stevens, "TCP Slow Start, Congestion Avoidance, Fast Retransmit, and Fast Recovery Algorithms", RFC2001, January 1997.

Congestion window size=Congestion window size+α/
congestion window size    (3)

In the Equations (1) to (3), if the latest value of the discarding interval is smaller than the average value Iavg, the increase amount α is decided by the average value Iavg and the congestion window is, therefore, increases linearly. If the latest value of the discarding interval is larger than the average value Iavg, the increase amount α increases linearly. Therefore, the congestion window increases in proportion to the square. The fact that the latest value of the discarding interval is larger than the average value Iavg means that network congestion is possibly relaxed as compared before. In this case, the congestion window is controlled to be large more rapidly.

If the packet receiver 1-4 detects the packet discard (step A4: Yes), the congestion window decrease amount calculator 1-8 decides a decrease amount for the congestion window (step A7). Using the decrease amount, the congestion window holding unit 1-6 updates the value of the congestion window (step A8). As a window decrease method, the congestion window may be decreased, for example, uniformly by half similarly to "TCP-Reno" or may be decreased as expressed by the following Equation (4) using the value of the RTT similarly to the method disclosed in the Japanese Patent Application Laid-Open No. 2006-217234.

Congestion window size=Congestion window size*1/
(1+c)    (4)

A congestion degree "c" in the Equation (4) is calculated as expressed by the following Equation (5).

$c$=(RTT−minimum RTT)/maximum RTT−minimum RTT)    (5)

In the Equation (5), if a buffer amount of the transmission data is quite small, "maximum RTT=minimum RTT" and the congestion degree "c" cannot be properly calculated. Alternatively, therefore, the congestion degree "c" may be calculated by adding a certain constant "r" as expressed by the following Equation (6).

$c$=(RTT−minimum RTT+$r$)/(maximum RTT−minimum RTT+$r$)    (6)

The packet discard interval calculator 1-9 updates the average value "Iavg" of the discarding intervals as expressed by the following Equation (7).

Iavg=$a$*Iavg+(1−$a$)*(current time−previous packet discard time)    (7)

In the Equation (7), "a" ($0 \leq a \leq 1$) denotes a parameter representing a convergence speed of convergence into average and can be arbitrarily set. If the parameter "a" is smaller, follow-up to the average is higher. If the parameter "a" is larger, the follow-up to the average is lower. If the follow-up is higher, resistance against a communication environment change is higher but stability is lower. Accordingly, the parameter "a" is preferably set in view of the balance between the resistance against the communication environment change and the stability.

The communication device 1 repeatedly performs the above-stated processing until transmission of all buffered data is completed (step A10).

As can be seen, the communication device 1 according to the first embodiment decides the increase amount according to the result of the comparison between the latest value of the discarding interval and the average value thereof if the congestion window is to be increased. According to the first embodiment, therefore, even if accurate RTT is difficult to calculate because of a quite small buffer amount of the transmission data from the communication device 1 and the congestion situation of the network is difficult to grasp, the increase amount for the congestion window can be appropriately set.

Second Embodiment (Configuration)

Figure 3:
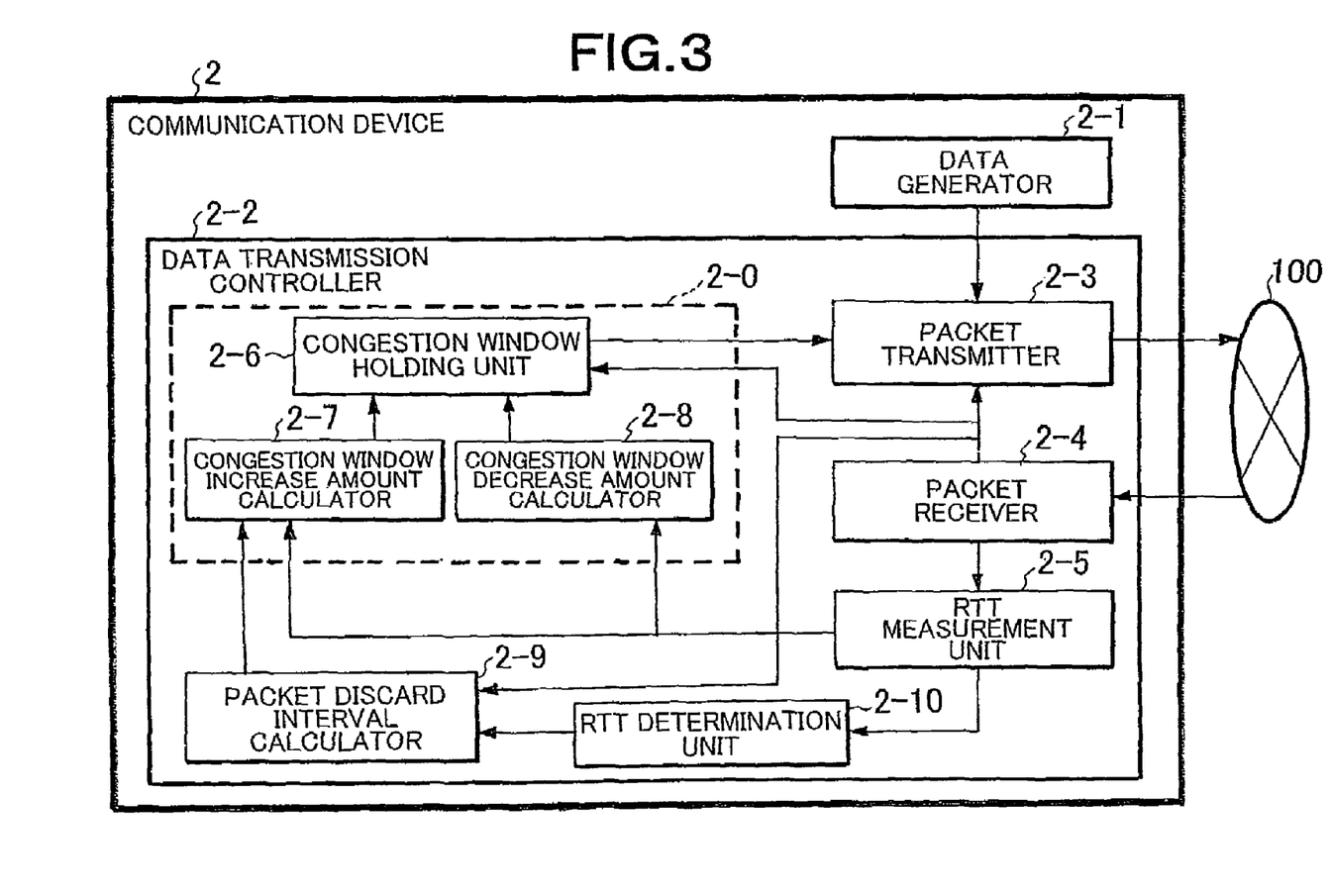
FIG. 3 is a block diagram showing a configuration of a communication device according to a second embodiment of the present invention.

FIG. 3 is a block diagram showing a configuration of a communication device 2 according to a second embodiment of the present invention. In the configuration shown in FIG. 3, constituent elements similar to those according to the first embodiment (FIG. 1) are denoted by corresponding reference symbols to the reference symbols used in the first embodiment, respectively. For example, a data generator 2-1 according to the second embodiment corresponds to the data generator 1-1 according to the first embodiment (FIG. 1).

The communication device 2 according to the second embodiment differs from the communication device 1 according to the first embodiment in the following respects. An RTT determination unit 2-10 is additionally provided in a data transmission controller 2-2, and a packet discard interval calculator 2-9 differs in calculation method from the packet discard interval calculator 1-9.

(Operation)

Figure 4:
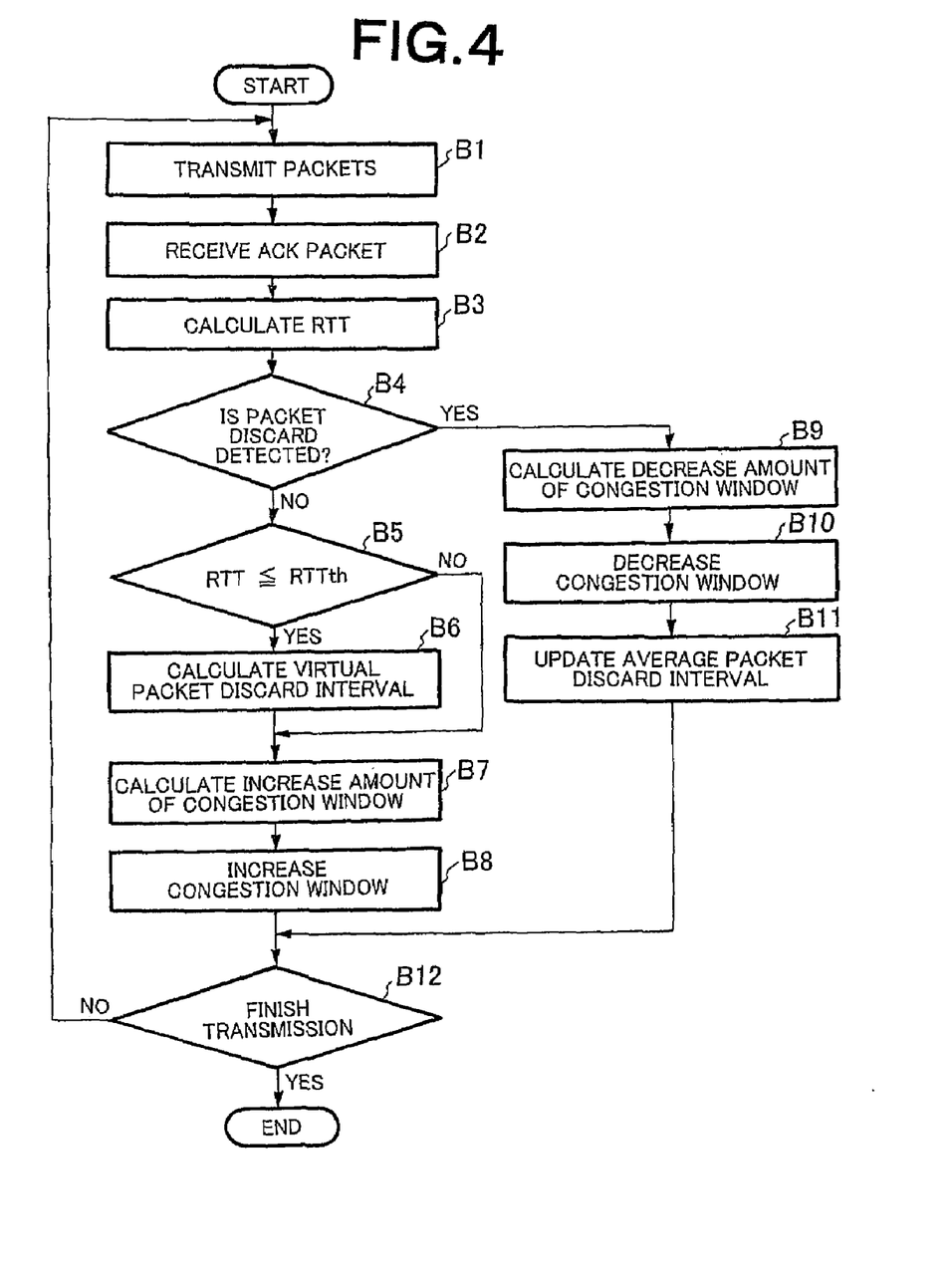
FIG. 4 is a flowchart showing operation according to the second embodiment of the present invention.

FIG. 4 is a flowchart describing operation performed by the communication device 2 according to the second embodiment. The operation performed by the communication device 2 according to the second embodiment will be described with reference to FIGS. 3 and 4. The operation according to the second embodiment differs from that according to the first embodiment in that the discarding interval is updated if RTT is equal to or smaller than a threshold (RTTth) and that the updated value is used for calculation of the increase amount for the congestion window.

Procedures (steps B1 to B4) since the data generator 2-1 generates transmission data until the communication device 2 receives an ACK packet, calculates RTT, and makes a packet discard determination are similar to corresponding procedures (steps A1 to A4) according to the first embodiment and will not be, therefore, repeatedly described. Different procedures from those according to the first embodiment will only be described below.

If a packet receiver 2-4 does not detect packet discard (step B4: No), the RTT determination unit 2-10 compares the RTT calculated by an RTT measuring unit 2-5 with the threshold (RTTth) prior to calculation of the increase amount for the congestion window. As a result of comparison, if the RTT is equal to or smaller than the threshold (RTTth) (step B5: Yes), a measured value "Icurr'" of the discarding interval is updated as expressed by the following Equation (8) using a latest reception interval of the ACK packet (step B6).

Icurr'=Icurr'+(current time−previous ACK reception time), if (RTT<RTTth)    (8)

The measured value "Icurr'" obtained by the Equation (8) is a value corresponding to a conditional discarding interval according to the present invention, that is, the discarding interval while the RTT is equal to or smaller than the threshold RTTth.

In this case, as the threshold RTTth, a value obtained by adding up a minimum value of the RTT up to this time and a preset fixed value or a value calculated using a certain constant "d" (0<d<1) as expressed by the following Equation (9) can be used.

$$RTTth = \text{minimum } RTT + d*(\text{maximum } RTT - \text{minimum } RTT) \quad (9)$$

A congestion window increase amount calculator 2-7 decides the increase amount α of the congestion window as expressed by the following Equation (10), that is, by using a larger value either the conditional discarding interval (Icurr') calculated by the Equation (8) or an average value (Iavg') thereof to be described later (step B7).

$$\alpha = b * f_2(RTT - \text{minimum } RTT) * \max(Iavg', Icurr') \quad (10)$$

In relation to the Equation (10), "$f_2(x)$" denotes an increase function of "x" and "b" denotes a parameter specifying a magnification of the increase amount α. The average value "Iavg'" of the discarding intervals is updated if the packet discard is detected according to a method described later.

If it is determined that the RTT exceeds the threshold (RTTth) (step B5: No), the congestion window increase amount calculator 2-7 calculates the increase amount α of the congestion window according to the similar method to that described in the first embodiment, that is, using the Equation (1) or (2).

A congestion window decrease amount calculator 2-8 updates the current congestion window to increase the value of the current congestion window by using the calculation result of the congestion window increase amount calculator 2-7 (step B8).

If the packet receiver 2-4 detects the packet discard (step B4: Yes), then the congestion window decrease amount calculator 2-8 decides the decrease amount for the congestion window (step B9), and a congestion window holding unit 2-6 updates the congestion window based on the decrease amount (step B10). Since the processing in the steps B9 and B10 is similar to that in the steps A7 and A8 according to the first embodiment, it will not be described herein.

The packet discard interval calculator 2-9 updates the average value "Iavg" of the discarding interval as expressed by the following Equation (11) (step B11). It is to be noted that "a" (0≦a≦1) denotes a similar parameter to that used in the Equation (7).

$$Iavg' = a * Iavg' + (1-a) * Icurr', Icurr' = 0 \quad (11)$$

The communication device 2 repeatedly performs the above-stated processing until transmission of all buffered data is completed (step B12).

According to the second embodiment, it is possible to attain the same advantages as those of the first embodiment. Furthermore, it is possible to prevent the increase amount α of the congestion window from being excessively increased in a situation in which a fluctuation in the congestion degree on the network is relatively small.

Third Embodiment (Configuration)

Figure 5:
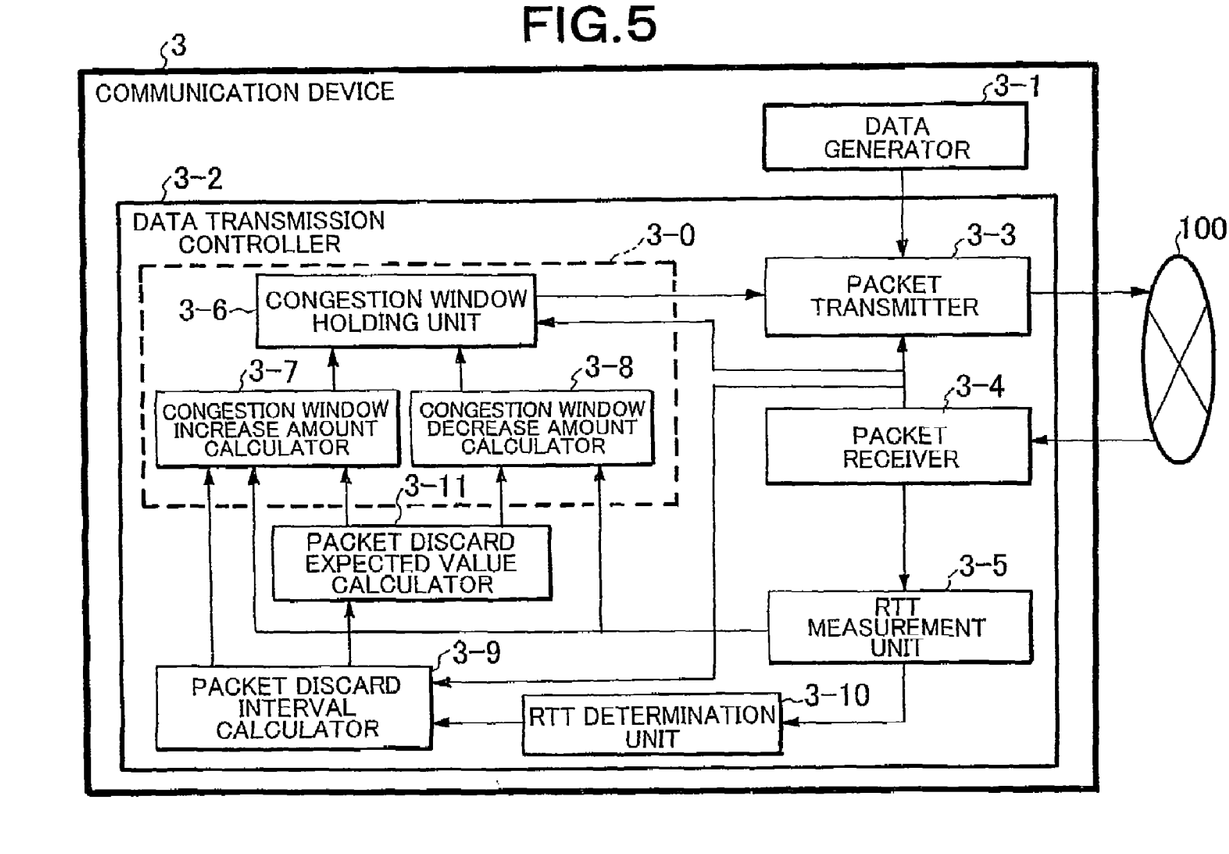
FIG. 5 is a block diagram showing a configuration of a communication device according to a third embodiment of the present invention.

FIG. 5 is a block diagram showing a configuration of a communication device 3 according to a third embodiment of the present invention. In the configuration shown in FIG. 5, constituent elements similar to those according to the second embodiment (FIG. 3) are denoted by corresponding reference symbols to the reference symbols used in the second embodiment, respectively. For example, a data generator 3-1 according to the third embodiment corresponds to the data generator 2-1 according to the second embodiment (FIG. 3).

The communication device 3 according to the third embodiment differs from the communication device 2 according to the second embodiment in the following respects. A packet discard expected value calculator 3-11 is additionally provided in a data transmission controller 3-2, and a congestion window setting unit 3-0 differs in window setting method from the congestion window setting unit 2-0.

(Operation)

Figure 6:
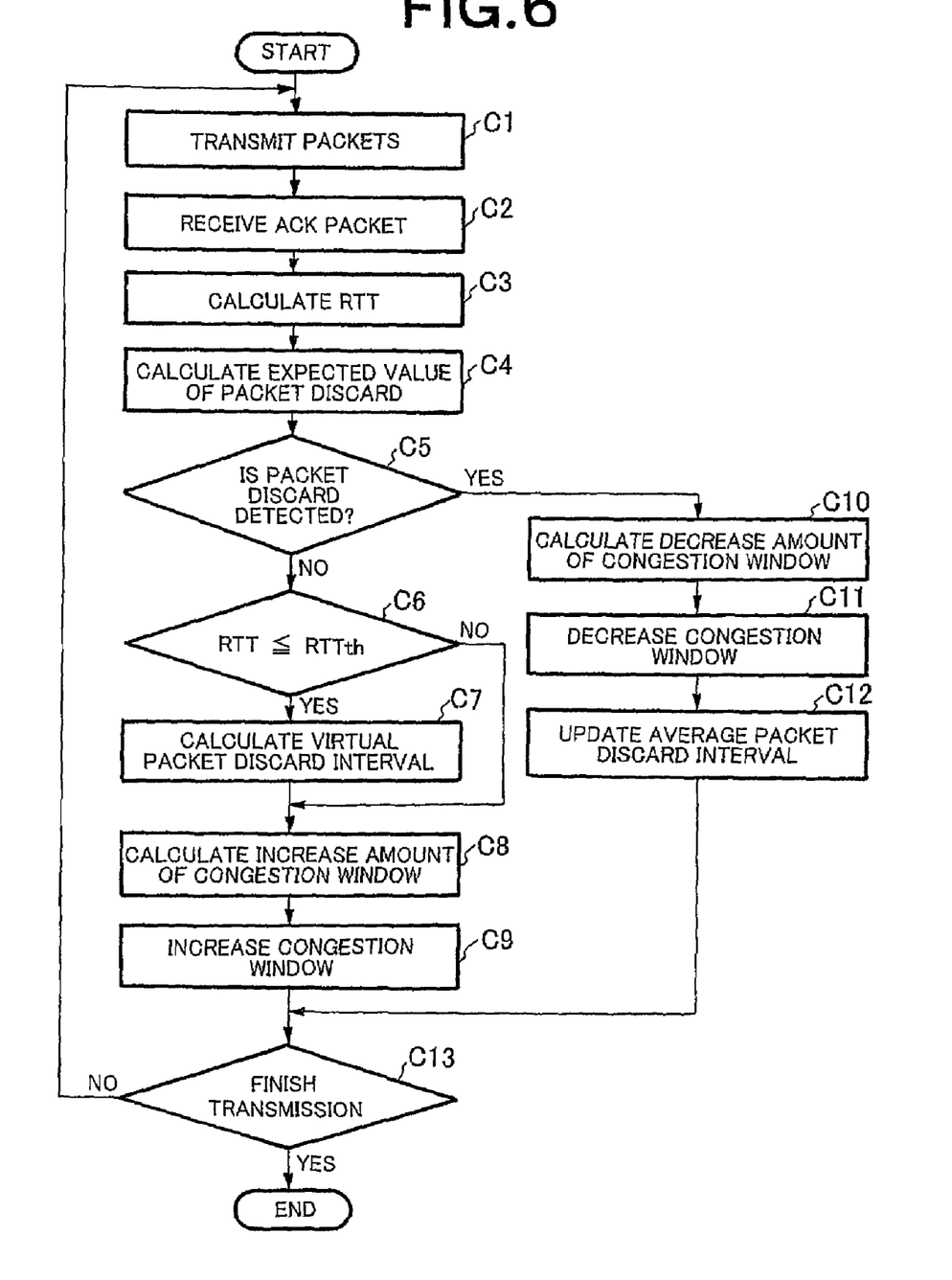
FIG. 6 is a flowchart showing operation according to the third embodiment of the present invention.

FIG. 6 is a flowchart describing operation performed by the communication device 3 according to the third embodiment. The operation performed by the communication device 3 according to the third embodiment will be described with reference to FIGS. 5 and 6. The operation according to the third embodiment differs from that according to the second embodiment in that an expected value of the discarding interval is calculated and the increase amount for the congestion window is made smaller if the expected value is larger. Different procedures from those according to the second embodiment will only be described below.

Procedures (steps C1 to C3 and C5) since the data generator 3-1 generates transmission data until the communication device 3 receives an ACK packet, calculates RTT, and makes a packet discard determination are similar to corresponding procedures (steps B1 to B4) according to the second embodiment and will not be, therefore, repeatedly described.

In the third embodiment, the packet discard expected value calculator 3-11 calculates an expected value "E" of the discarding interval as expressed by the following Equation (12) (step C4).

$$E = g(Iavg', Icurr') \quad (12)$$

In the Equation (12), a function "g(x, y)" (0≦g(x, y)≦1) is a function showing a minimum value at "y=0" or "y=∞" and showing a maximum value at "y=x". Further, "Icurr'" denotes the conditional discarding interval as expressed by the Equation (8). "Iavg'" denotes the average value of the discarding interval as expressed by the Equation (11).

If a packet receiver 3-4 does not detect packet discard (step C5: No), a congestion window increase amount calculator 3-7 decides the increase amount α of the congestion window by using the expected value "E" as expressed by the following Equation (13) (step C8).

$$\alpha = b * f_2(RTT - \text{minimum } RTT) * \max(Iavg', Icurr') * (1-E) \quad (13)$$

The Equation (13) corresponds to an equation obtained by multiplying the Equation (10) of the increase amount α according to the second embodiment by a term (1−E) using the expected value E. A congestion window holding unit 3-6 updates the congestion window to increase the value of the congestion window by using the calculated increase amount α (step C9).

If the packet receiver 3-4 detects the packet discard (step C5: Yes), processing procedures (steps C10 to C12) are similar to the corresponding processing procedures (steps B9 to B11) according to the second embodiment. Therefore, the processing procedures (steps C10 to C12) will not be described herein.

The communication device 3 repeatedly performs the above-stated processing until transmission of all buffered data to the network 100 is completed (step C13).

As modifications of the third embodiment, the expected value "E" may be calculated as expressed by the following Equations (14), (15) or (16), wherein the function "g(x,y)" has the same definition as that in the Equation (12).

$$E = g(Iavg, (\text{current time} - \text{previous packet discard time})) \quad (14)$$

$$E = g(\text{estimated line band, current transmission band}) \quad (15)$$

$$E = g(W, \text{current congestion window size}) \quad (16)$$

The Equation (14) is an equation for calculating the expected value "E" using the average value "Iavg" of the discarding interval according to the first embodiment and the latest value of the discarding interval. The Equation (15) is an equation using an estimated line band and a current transmission band. The Equation (16) is an equation using a congestion window size, and "W" denotes the congestion window size or an average value of congestion window sizes applied when the packet discard occurred previously.

According to the third embodiment, it is possible to attain the same advantages as those of the first embodiment. Furthermore, it is possible to prevent the increase amount α of the congestion window from being excessively increased even in a situation in which the change in the RTT is difficult to detect because of a quite small buffer amount of the transmission data.

Fourth Embodiment (Configuration)

A communication device according to a fourth embodiment of the present invention is similar in configuration to the communication device 3 according to the third embodiment (FIG. 5), and will not be, therefore, repeatedly described herein.

(Operation)

Operation performed by the communication device according to the fourth embodiment is similar in procedures to that according to the third embodiment (FIG. 6) except for a calculation method of the increase amount α of the congestion window. According to the fourth embodiment, the increase amount α is calculated using the following Equation (17). The Equation (17) is an equation obtained by adding a subtraction term to the Equation (13). It suffices that the subtraction term is an increase function of the RTT.

$$\alpha = b \cdot f_2(\text{RTT} - \text{minimum RTT}) \cdot \max(Iavg', Icurr') \cdot (1-E) - (\text{RTT} - \text{minimum RTT}) \cdot (\text{congestion window size}/\text{RTT}) + 1 \quad (17)$$

The Equation (17) indicates that the congestion window that exhibits a similar property to that of the congestion window based on the congestion control method using the RTT such as "FAST" disclosed in Cheng Jin, David X. Wei, Steven H. Low, G. Buhrmaster, J. Bunn, D. H. Choe, R. L. A. Cottrell, J. C. Doyle, W. Feng, O. Martin, H. Newman, F. Paganini, S. Ravot, S. Singh, "IEEE Network", 19(1):4-11, January/February 2005. Namely, the subtraction term shown in the Equation (17) represents a packet amount in a queue of a router that is a bottleneck on the network. According to the Equation (17), a value corresponding to this packet amount is subtracted from the congestion window size.

According to the fourth embodiment, it is possible to exhibit similar features to those of the congestion control method using the RTT. Namely, it is advantageously possible to enable the congestion window size to converge into an optimum value even in a stationary state and ensure high fairness of throughput among flows even if the flows differ in RTT.

Fifth Embodiment (Configuration)

A communication device according to a fifth embodiment of the present invention is similar in configuration to that according to the third embodiment (FIG. 5), and will not be, therefore, repeatedly described herein.

(Operation)

Operation performed by the communication device according to the fifth embodiment is similar in procedures to that according to the third embodiment (FIG. 6) except for a calculation method of the RTT calculated by the RTT measuring unit 3-5. The RTT measuring unit 3-5 according to the fifth embodiment calculates RTT similarly to the RTT measuring unit 3-5 according to the third embodiment, that is, similarly to the RTT measuring unit 1-5 according to the first embodiment. A calculated value, i.e., "measured RTT" is revised using a certain constant "r" and the expected value "E" of the discarding interval as expressed by the following Equation (18). According to the Equation (18), the value of the RTT is revised to be larger if the expected value "E" of the discarding interval is larger.

$$\text{revised RTT} = \text{Measured RTT} + r \cdot E \quad (18)$$

The congestion window setting unit 3-0 according to the fifth embodiment uses the revised value according to the Equation (18) ("revised RTT") as the RTT when calculating the increase amount and the decrease amount for the congestion window. Therefore, the expected value "E" of the discarding interval reflects in the updated congestion window.

In the fifth embodiment, the expected value "E" of the discarding interval is included in the "revised RTT" according to the Equation (18). Therefore, the increase amount α of the congestion window is calculated using the following Equation (19) obtained by deleting the term "1−E" from the Equation (13) used in the third embodiment.

$$\alpha = b \cdot f_2(\text{revised RTT} - \text{minimum RTT}) \cdot \max(Iavg', Icurr') \quad (19)$$

According to the fifth embodiment, the RTT used to update the congestion window is revised by the expected value "E" of the discarding interval. Therefore, the congestion window can be appropriately set even in a situation in which the change in the RTT is difficult to detect because of a quite small buffer amount of the transmission data. It is thereby possible to prevent the increase amount for the congestion window from being excessively increased and the decrease amount thereof from being excessively decreased.

Sixth Embodiment (Configuration)

Figure 7:
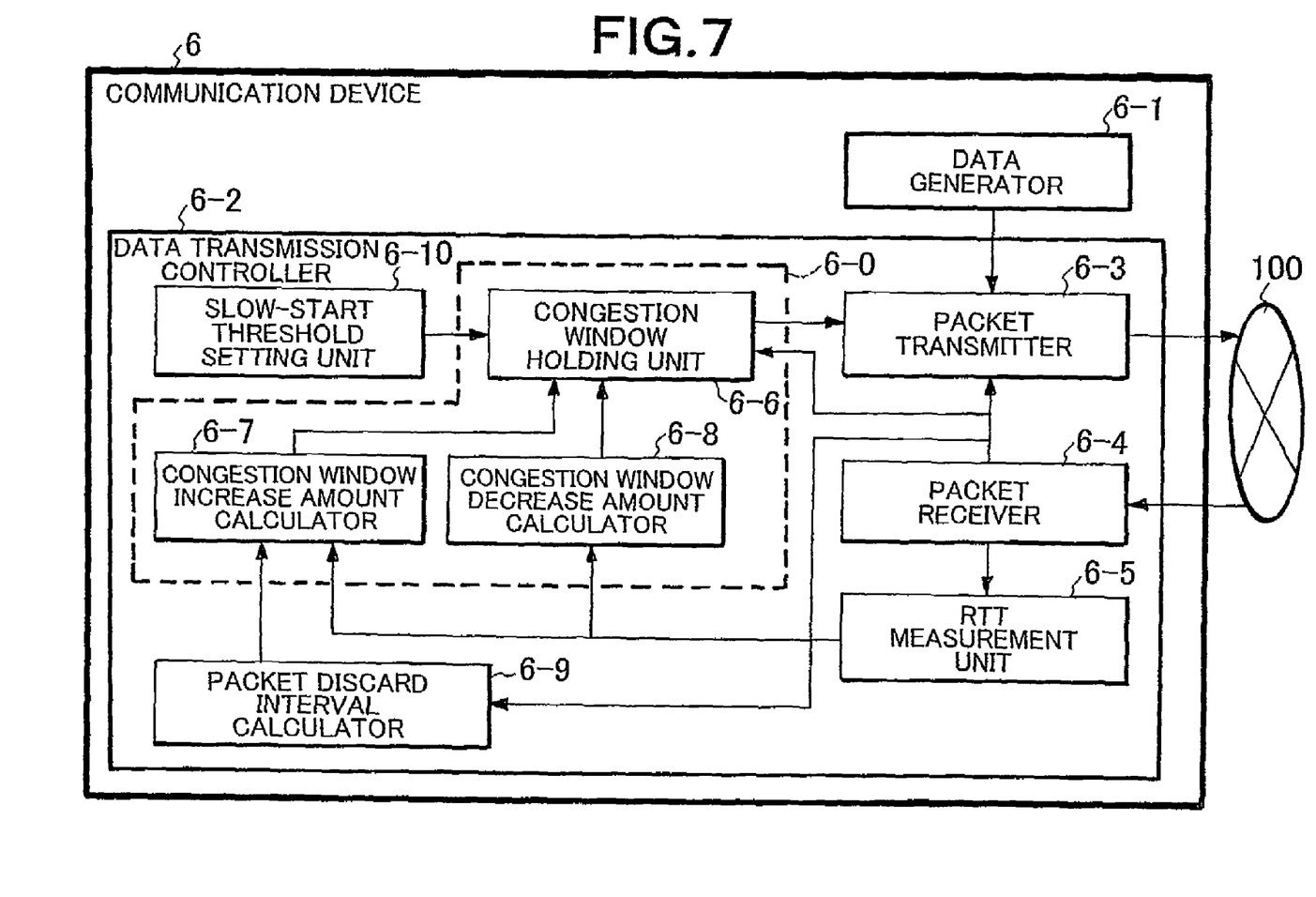
FIG. 7 is a block diagram showing a configuration of a communication device according to a sixth embodiment of the present invention.

FIG. 7 is a block diagram showing a configuration of a communication device 6 according to a sixth embodiment of the present invention. In the configuration shown in FIG. 7, constituent elements similar to those according to the first embodiment (FIG. 1) are denoted by corresponding reference symbols to the reference symbols used in the first embodiment, respectively. For example, a data generator 6-1 according to the sixth embodiment corresponds to the data generator 1-1 according to the first embodiment (FIG. 1).

The communication device 6 according to the sixth embodiment differs from the communication device 1 according to the first embodiment in the following respects. A slow-start threshold setting unit 6-10 is additionally provided in a data transmission controller 6-2, and a congestion window holding unit 6-6 differs in congestion window increase method from the congestion window holding unit 1-6.

(Operation)

Figure 8:
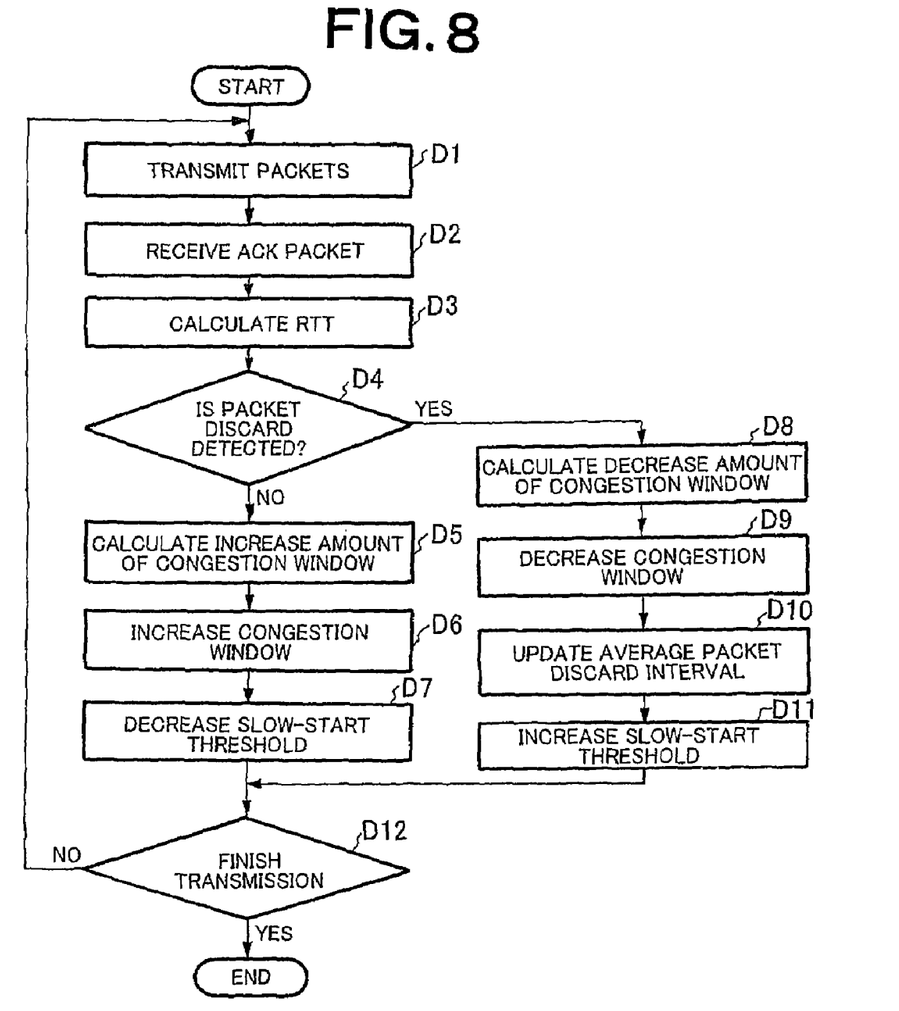
FIG. 8 is a flowchart showing operation according to the sixth embodiment of the present invention.

FIG. 8 is a flowchart describing operation performed by the communication device 6 according to the sixth embodiment. The operation performed by the communication device 6 according to the sixth embodiment will be described with reference to FIGS. 7 and 8. Procedures (steps D1 to D4) since the data generator 6-1 generates transmission data until the communication device 6 receives an ACK packet, calculates RTT, and makes a packet discard determination are similar to corresponding procedures (steps A1 to A4) according to the first embodiment and will not be, therefore, repeatedly described.

Furthermore, procedures according to the sixth embodiment are similar to those according to the first embodiment except for the update (increase) of the congestion window and the setting of a slow-start threshold. Different procedures from those according to the first embodiment will only be described below.

If a packet receiver 6-4 does not detect packet discard (step D4: No), a congestion window increase amount calculator 6-7 calculates the increase amount α of the congestion window similarly to the first embodiment (step D5).

The congestion window holding unit 6-6 increases the congestion window as expressed by the following Equation (20) or (21) according to the comparison of the current congestion window with a slow-start threshold "SSth" set by the slow-start threshold setting unit 6-10 (step D6).

Congestion window size=Congestion window size+α/
congestion window size, if (congestion window
size>SSth)     (20)

Congestion window size=Congestion window size+1,
if (congestion window size≦SSth)     (21)

Namely, the Equation (20) is used if the current congestion window is larger in size than the threshold SSth, and the Equation (21) is used if the current congestion window is smaller in size than the threshold SSth. By doing so, while the packet discard is not detected, the congestion window is controlled to be increased at slower speed if the current congestion window size is smaller.

If the packet discard is not detected (step D4: No), the slow-start threshold setting unit 6-10 decreases the threshold "SSth" as expressed by the following Equation (22) (step D7).

SSth=max(SSth+1/congestion window size, congestion window size/2)     (22)

If the packet discard is detected (step D4: Yes), the slow-start threshold setting unit 6-10 increases the threshold "SSth" as expressed by the following Equation (23) (step D11).

SSth=SSth/2     (23)

The threshold "SSth" calculated as expressed by the Equation (22) or (23) signifies that the congestion window size is calculated similarly to the congestion window size based on the AIMD scheme such as "TCP-Reno" disclosed in W. Stevens, "TCP Slow Start, Congestion Avoidance, Fast Retransmit, and Fast Recovery Algorithms", RFC2001, January 1997.

According to the sixth embodiment, the congestion window size is controlled not to be smaller than the congestion window size according to the AIMD scheme. It is, therefore, advantageously possible to keep fairness of throughput if the communication method according to the sixth embodiment coexists with the conventional AIMD control method on the network.

Although the exemplary embodiments of the present invention are described as mentioned above, it should be understood that various changes, substitutions and alternatives can be made therein without departing from the spirit and scope of the invention as defined by the appended claims. Further, it is the inventor's intent to retain all equivalents of the claimed invention even if the claims are amended during prosecution.

What is claimed is:

1. A communication method on a communication device, comprising steps of:
a transmission unit transmitting a plurality of packets to a network according to a window specifying a data amount of the packets to be transmitted to the network;
a reception unit receiving acknowledgement (ACK) related to the packets transmitted to the network, and detecting whether or not packet discard occurs;
an RTT measurement unit measuring a round trip time (RTT) by using the received ACK;
a discard interval calculation unit calculating a discarding interval indicating a time interval of the packet discard based on the packet discard detected by the reception unit;
a window setting unit calculating an increase amount for a current window by using the calculated discarding interval; and
the window setting unit updating the current window by using the calculated increase amount if the packet discard is not detected, wherein
the step of calculating the discarding interval includes calculating an average value of the discarding interval up to current time, and
the step of calculating the increase amount includes calculating the increase amount by using a product between a parameter specifying a magnification of an increase amount for a window and a larger value either a latest value of the discarding interval or the calculated average value of the discarding interval.

2. The communication method according to claim 1, wherein the step of calculating the increase amount includes calculating the increase amount by multiplying the product by a decrease function of the measured RTT.

3. A communication method on a communication device, comprising steps of:
a transmission unit transmitting a plurality of packets to a network according to a window specifying a data amount of the packets to be transmitted to the network;
a reception unit receiving acknowledgement (ACK) related to the packets transmitted to the network, and detecting whether or not packet discard occurs;
an RTT measurement unit measuring a round trip time (RTT) by using the received ACK;
a discard interval calculation unit calculating a discarding interval indicating a time interval of the packet discard based on the packet discard detected by the reception unit;
a window setting unit calculating an increase amount for a current window by using the calculated discarding interval; and
the window setting unit updating the current window by using the calculated increase amount if the packet discard is not detected, further comprising a step of determining whether or not the measured RTT is equal to or smaller than a threshold,
wherein the step of calculating the discarding interval includes calculating a conditional discarding interval which is the discarding interval while the measured RTT is equal to or smaller than the threshold, and calculating an average value of the conditional discarding interval up to current time, and the step of calculating the increase amount includes calculating the increase amount for the current window by using a product among a parameter specifying a magnification of an increase amount for a window, an increase function of the measured RTT, and a larger value either a latest value of the conditional discarding interval or the average value of the conditional discarding interval.

4. The communication method according to claim 3, further comprising a step of calculating an expected value of a discarding interval by using the calculated discarding interval, wherein the step of calculating the increase amount includes calculating the increase amount by multiplying the product by a term (1−E) including a value E as the calculated expected value of a discarding interval.

5. The communication method according to claim 4, wherein the step of calculating the expected value includes calculating the expected value by using a function $g(x, y)$ having a maximum value while the x is equal to the y, where the x is the calculated average value of the conditional discarding interval and the y is the latest value of the conditional discarding interval.

6. The communication method according to claim 4, wherein the step of calculating the expected value includes calculating the expected value by using a function $g(x, y)$ having a maximum value while the x is equal to the y, where the x is a calculated average value of the discarding interval and the y is the latest value of the conditional discarding interval.

7. The communication method according to claim 4, wherein the step of calculating the increase amount includes calculating the increase amount for the current window by subtracting a term of the increase function of the measured RTT from a value obtained by multiplying the product by the term (1−E).

8. The communication method according to claim 3, further comprising a step of calculating an expected value of a discarding interval by using the calculated discarding interval, wherein the step of measuring the RTT includes revising the measured RTT by adding the calculated expected value of a discarding interval to the measured RTT, and the step of calculating the increase amount includes calculating the increase amount by using the revised measured RTT.

9. The communication method according to claim 8, wherein the step of calculating the expected value includes calculating the expected value by using a function $g(x, y)$ having a maximum value while the x is equal to the y, where the x is the calculated average value of the conditional discarding interval and the y is the latest value of the conditional discarding interval.

10. A communication device comprising:

a transmission unit transmitting a plurality of packets to a network according to a window specifying a data amount of the packets to be transmitted to the network;

a reception unit receiving acknowledgement (ACK) related to the packets transmitted to the network, and detecting whether or not packet discard occurs;

an RTT measurement unit measuring a round trip time (RTT) by using the received ACK;

a discard interval calculation unit calculating a discarding interval indicating a time interval of the packet discard based on the packet discard detected by the reception unit; and a window setting unit calculating an increase amount for a current window by using the calculated discarding interval, and updating the current window by using the calculated increase amount if the reception unit does not detect the packet discard, wherein the discard interval calculation unit calculates an average value of the discarding interval up to current time whenever calculating the discarding interval, and the window setting unit calculates the increase amount by using a product between a parameter specifying a magnification of an increase amount for a window and a larger value either a latest value of the discarding interval or the calculated average value of the discarding interval.

11. The communication device according to claim 10, wherein the window setting unit calculates the increase amount by multiplying the product by a decrease function of the measured RTT.

12. A communication device comprising:

a transmission unit transmitting a plurality of packets to a network according to a window specifying a data amount of the packets to be transmitted to the network;

a reception unit receiving acknowledgement (ACK) related to the packets transmitted to the network, and detecting whether or not packet discard occurs;

an RTT measurement unit measuring a round trip time (RTT) by using the received ACK;

a discard interval calculation unit calculating a discarding interval indicating a time interval of the packet discard based on the packet discard detected by the reception unit; and a window setting unit calculating an increase amount for a current window by using the calculated discarding interval, and updating the current window by using the calculated increase amount if the reception unit does not detect the packet discard, further comprising a RTT determination unit determining whether or not the measured RTT is equal to or smaller than a threshold, wherein the discard interval calculation unit calculates a conditional discarding interval which is the discarding interval while the measured RTT is equal to or smaller than the threshold, and calculates an average value of the conditional discarding interval up to current time whenever calculating the conditional discarding interval, and the window setting unit calculates the increase amount for the current window by using a product among a parameter specifying a magnification of an increase amount for a window, an increase function of the measured RTT, and a larger value either a latest value of the conditional discarding interval or the average value of the conditional discarding interval.

13. The communication device according to claim 12, further comprising an expected value calculation unit calculating an expected value of a discarding interval by using the calculated discarding interval, wherein the window setting unit calculates the increase amount by multiplying the product by a term (1−E) including a value E as the calculated expected value of a discarding interval.

14. The communication device according to claim 13,
wherein the expected value calculation unit calculates the expected value by using a function g(x, y) having a maximum value while the x is equal to the y, where the x is the calculated average value of the conditional discarding interval and the y is the latest value of the conditional discarding interval.

15. The communication device according to claim 13,
wherein the expected value calculation unit calculates the expected value by using a function g(x, y) having a maximum value while the x is equal to the y, where the x is the calculated average value of the conditional discarding interval and the y is a latest value of the discarding interval.

16. The communication device according to claim 13,
wherein the window setting unit calculates the increase amount for the current window by subtracting a term of the increase function of the measured RTT from a value obtained by multiplying the product by the term (1−E).

17. The communication device according to claim 12, further comprising an expected value calculation unit calculating an expected value of a discarding interval by using the calculated discarding interval,
wherein the RTT measurement unit revises the measured RTT by adding the calculated expected value of a discarding interval to the measured RTT, and
the window setting unit calculates the increase amount by using the revised measured RTT.

18. The communication device according to claim 17,
wherein the expected value calculation unit calculates the expected value by using a function g(x, y) having a maximum value while the x is equal to the y, where the x is the calculated average value of the conditional discarding interval and the y is the latest value of the conditional discarding interval.

* * * * *